United States Patent
Rao et al.

(10) Patent No.: US 10,936,295 B2
(45) Date of Patent: Mar. 2, 2021

(54) SOFTWARE UPDATE SYSTEM

(71) Applicant: Dell Products L.P., Round Rock, TX (US)

(72) Inventors: Sanjay Rao, Austin, TX (US); Divya Vijayvargiya, Cedar Park, TX (US); Rajib Saha, KA (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/178,355

(22) Filed: Nov. 1, 2018

(65) Prior Publication Data

US 2020/0142683 A1 May 7, 2020

(51) Int. Cl.
*G06F 8/65* (2018.01)
*G06F 9/4401* (2018.01)

(52) U.S. Cl.
CPC .............. *G06F 8/65* (2013.01); *G06F 9/4406* (2013.01)

(58) Field of Classification Search
CPC ................................. G06F 8/65; G06F 9/4406
See application file for complete search history.

(56) References Cited

U.S. PATENT DOCUMENTS

| | | | | |
|---|---|---|---|---|
| 7,484,084 B1* | 1/2009 | Ranaweera | ............. | G06F 8/656 713/1 |
| 7,673,023 B1* | 3/2010 | Nelson | ...................... | G06F 8/65 709/221 |
| 9,507,581 B2 | 11/2016 | Butcher et al. | | |
| 10,127,032 B2* | 11/2018 | Su | ........................... | G06F 8/654 |
| 10,146,527 B2* | 12/2018 | Olarig | ...................... | G06F 8/654 |
| 10,409,584 B1* | 9/2019 | Kulchytskyy | ............. | G06F 8/65 |
| 2005/0229173 A1* | 10/2005 | Mihm | ........................ | G06F 8/65 717/171 |

(Continued)

FOREIGN PATENT DOCUMENTS

CN          109491855 A     *  3/2019

OTHER PUBLICATIONS

Authors et al., "A system and method of data processing between host OS and BMC based on an individual USB storage device", Jun. 2013, IP.com (Year: 2013).*

(Continued)

*Primary Examiner* — Anna C Deng
*Assistant Examiner* — Junchun Wu
(74) *Attorney, Agent, or Firm* — Haynes and Boone, LLP

(57) ABSTRACT

A software update system includes a chassis housing a plurality of component, an Operating System (OS) engine that is configured to provide an OS, and a Baseboard Management Controller (BMC). The BMC is coupled to each of the plurality of components, as well as to the OS engine via an OS-to-BMC interface. The BMC retrieves a software update catalog that includes a plurality of software updates, and identifies OS software updates that are included in the plurality of software updates in the software update catalog, and component software updates that are included in the plurality of software updates in the software update catalog. The BMC provides the OS software updates to the OS engine via the OS-to-BMC interface, and the OS engine provides the OS software updates for the OS. The BMC then provides the component software updates for the plurality of components.

15 Claims, 3 Drawing Sheets

(56) References Cited

U.S. PATENT DOCUMENTS

| | | | | |
|---|---|---|---|---|
| 2008/0313312 | A1* | 12/2008 | Flynn | G06F 3/0613 709/221 |
| 2009/0113416 | A1* | 4/2009 | Bealkowski | G06F 8/65 717/177 |
| 2012/0158890 | A1* | 6/2012 | Jreij | G06F 11/0784 709/217 |
| 2013/0254759 | A1* | 9/2013 | Xu | G06F 8/61 717/174 |
| 2013/0290947 | A1* | 10/2013 | Li | G06F 8/65 717/171 |
| 2014/0004825 | A1* | 1/2014 | Prakash | G06F 21/74 455/411 |
| 2014/0109075 | A1* | 4/2014 | Hoffman | G06F 11/1464 717/169 |
| 2014/0122852 | A1* | 5/2014 | Guo | G06F 9/00 713/1 |
| 2014/0298091 | A1* | 10/2014 | Carlen | G06F 9/54 714/15 |
| 2018/0026835 | A1* | 1/2018 | Nachimuthu | H04L 49/357 717/172 |
| 2018/0173516 | A1* | 6/2018 | Tung | G06F 8/63 |

OTHER PUBLICATIONS

Sakthikumar et al., "A Tour beyond BIOS Implementing the ACPI Platform Error Interface with the Unified Extensible Firmware Interface", Jan. 2013, Intel (Year: 2013).*

Kochhar et al., "Configuring the BMC and BIOS", Nov. 2005, Dell Power Solutions (Year: 2005).*

An et al., "Design of Framework supporting IPMI and DCMI based on Open BMC", Sep. 2017, ACM (Year: 2017).*

* cited by examiner

SOFTWARE UPDATE SYSTEM

BACKGROUND

The present disclosure relates generally to information handling systems, and more particularly to providing driver and application updates for an operating system of an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system such as, for example, server devices, are often subject to software updates that ensure that the server device operates optimally. For example, server devices may include a variety of server components that may be subject to firmware updates, as well as an operating system that may be subject to driver updates and/or application updates. Conventionally, such server devices are provided with multiple update subsystems in order to enable the installation of software updates on all the server components and the operating system: a Baseboard Management Controller (BMC) or remote access controller, and a management console. The BMC/remote access controller is configured to retrieve a software catalog that includes software updates for the server device, identify the firmware updates for the server components in the server device, and install those firmware updates. The management console is configured to retrieve that same software catalog that includes the software updates for the server device, identify the driver updates and/or application updates for the operating system in the server device, and install those driver updates and/or application updates. As such, the conventional updating of server devices requires that the server device include two updating subsystems (the BMC/remote access controller and the management console), requires the retrieval of multiple copies of the same software catalog (i.e., one for each the BMC/remote access controller and the management console), and requires an administrator to coordinate the firmware update installation and the driver update/application update installation between the BMC/remote access controller and the management console, which produces inefficiencies and increased costs associated with the server device update process.

Accordingly, it would be desirable to provide an improved software update system.

SUMMARY

According to one embodiment, an Information Handling System (IHS) includes a Baseboard Management Controller (BMC) that is coupled to an Operating System (OS)-to-BMC interface, wherein the BMC is configured to: identify OS software updates that are included in a plurality of software updates provided in a software update catalog, and component software updates that are included in the plurality of software updates provided in the software update catalog; transmit the OS software updates through the OS-to-BMC interface; and provide the component software updates for a plurality of components; a processing system that is coupled to the OS-to-BMC interface; and a memory system that is coupled to the processing system and that includes instructions that, when executed by the processing system, cause the processing system to: receive the OS software updates via the OS-to-BMC interface; and provide the OS software updates for an OS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
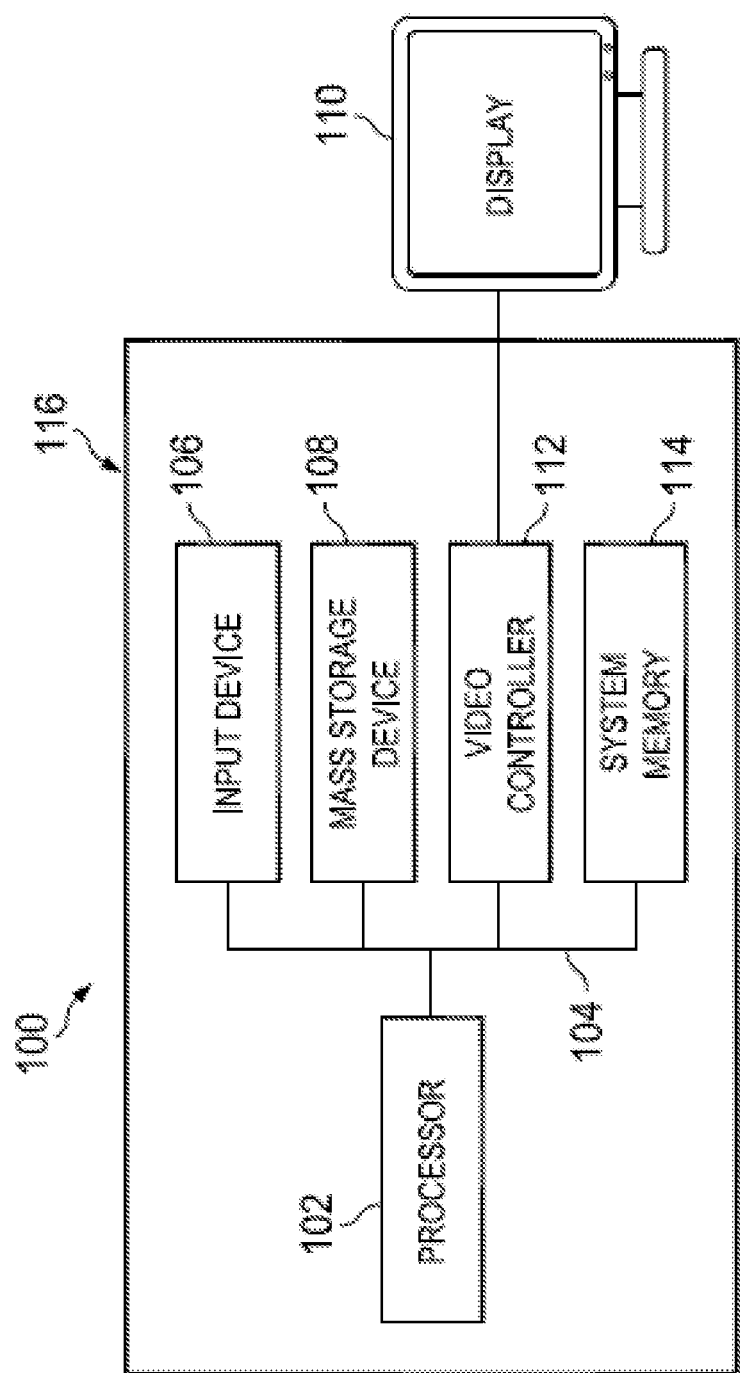
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
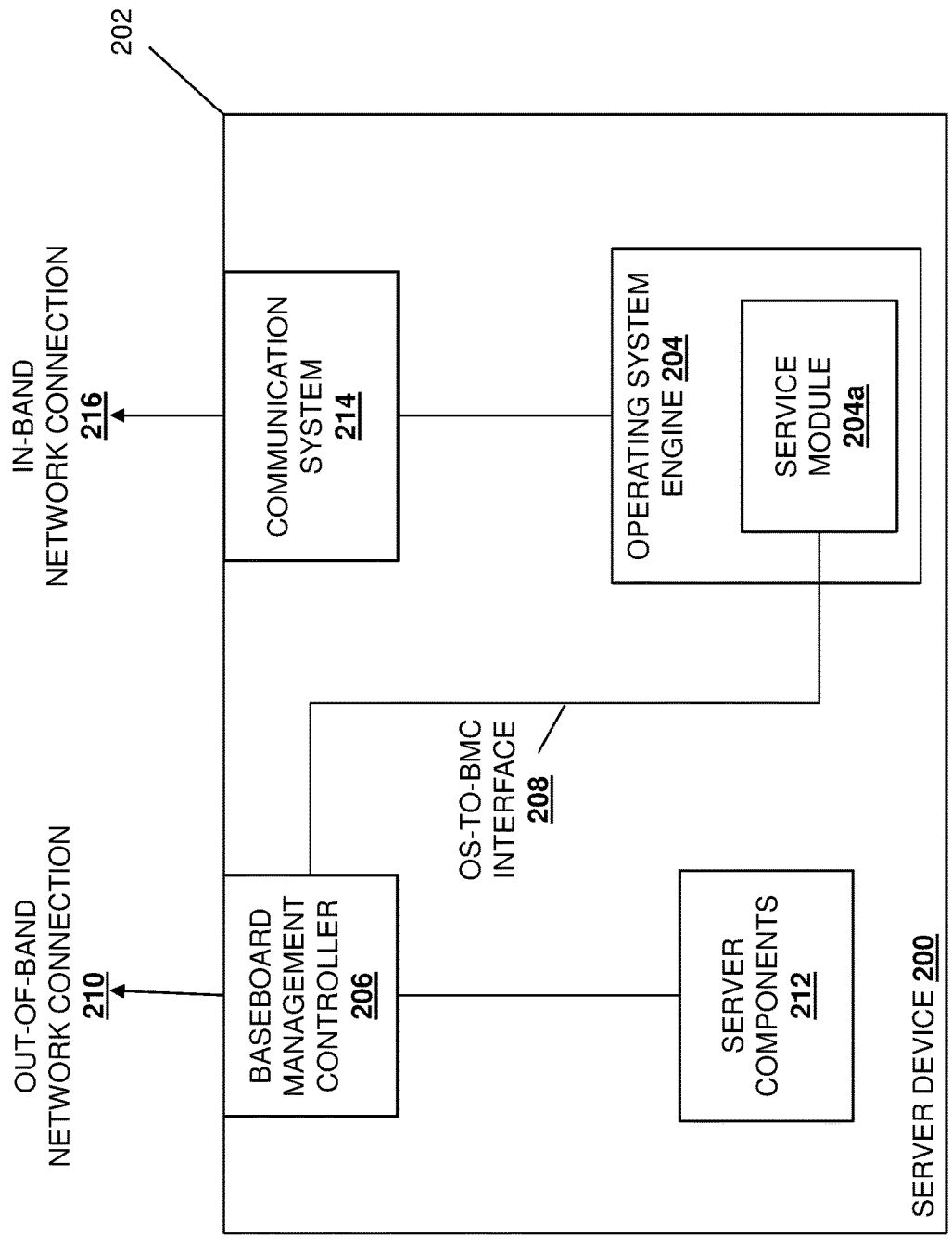
FIG. 2 is a schematic view illustrating an embodiment of a software update system.

Referring now to FIG. 2, an embodiment of a software update system 200 is illustrate that, in the examples provided below, is included in a server device 200 and provides for the updating of server component firmware, operating system drivers, operating system applications, and/or other software utilized by the server device 200. However, one of skill in the art in possession of the present disclosure will recognize that the software update system of the present disclosure will provide benefits for the updating of software on a variety of other computing systems (e.g., storage devices, networking devices, desktop computing devices, laptop/notebook computing devices, tablet computing devices, mobile phones, etc.) while remaining within the scope of the present disclosure. The server device 200 may be provided by the IHS 100 discussed above with reference to FIG. 1, and/or may include some or all of the components of the IHS 100. In the illustrated embodiment, the server device 200 includes a chassis 202 that houses the components of the server device 200, only some of which are illustrated in FIG. 2. For example, the chassis 202 may house a processing system (not illustrated, but which may include the processor discussed above with reference to FIG. 1) and a memory system (not illustrated, but which may include the memory 114 discussed above with reference to FIG. 1) that includes instructions that, when executed by the processing system, cause the processing system to provide an operating system (OS) engine 204 that is configured to perform the functions of the OS engines discussed below.

In the illustrated embodiment, a service module 204a is included in the OS engine 204 via, for example, instructions included on the memory system that, when executed by the processing system, cause the processing system to provide the service module 204a that is configured to perform the functions of the service modules discussed below. For example, the service module 204a may be provided by an integrated DELL® Remote Access Controller (iDRAC) service module (iSM) available from DELL® Inc. of Round Rock, Tex., United States. As would be understood by one of skill in the art, the iSM available from DELL® Inc. provides a lightweight software service that integrates OS features with the iDRAC available from DELL® Inc., and include functionality such as providing OS information to the iDRAC, adding capabilities such as lifecycle log event replication into the operating system log, WINDOWS® Management Instrumentation (WMI) support (including storage), iDRAC Simple Network Management Protocol (SNMP) alerts via the operating system, iDRAC hard reset and remote full power cycle capabilities, automated report collection processes, and other functionality, while producing relatively little impact on the processing system (and relatively small footprint in the memory system). As discussed in further detail below, the service module 204a may be provided in the OS engine 204 during an initial boot of the server device 200, or may be factory installed in the server device 200 by a server device provider.

The chassis 202 may house a Baseboard Management Controller (BMC) 206 that is coupled to the operating system engine 204 via an OS-to-BMC interface 208 that extends between the BMC 206 and the processing system that provides the OS engine 204, which enables the communications between the BMC 206 and the service module 204a discussed below. In the examples provided below, the OS-to-BMC interface 208 is provided by a Universal Serial Bus (USB) Network Interface Controller (NIC) interface. For example, the USB NIC interface is sometimes referred to as an "OS-to-iDRAC pass-through", which may provide for high-speed bi-directional in-band communication between the iDRAC and OS. However, while the discussions below describe the OS-to-BMC interface 208 as a USB NIC interface, one of skill in the art in possession of the present disclosure will recognize that the OS-to-BMC interface 208 may be provided by other components and/or in other manners that will fall within the scope of the present disclosure as well.

In an embodiment, the BMC 206 may be provided by the iDRAC discussed above, although other BMCs and/or remote access controllers may fall within the scope of the present disclosure as well. As would be understood by one of skill in the art in possession of the present disclosure, BMCs and/or remote access controllers may provide an out-of-band management platform via, for example, a separate expansion card, or via functionality integrated into the main circuit board in the server device 200 (e.g., as with the iDRAC), and include resources that are separate from the server device 200 and that may enable a browser-based interface and/or command line interface for managing and monitoring server components and/or functions. For example, the iDRAC available from DELL® Inc. includes its own processing system, memory system, network connection, and access to the server device system bus, which enabled power management, virtual media access, remote console capabilities, all available via a web browser or command-line interface, which gives system administrators the ability to configure the server device 200 as if they were sitting at a console local to the server device 200. As such, the BMC 206 includes an out-of-band network connection 210 to, for example, an administrator device (not illustrated), as well as one or more couplings to server components 212 (e.g., via the service device system bus discussed above), which may include a variety of server components that utilize software such as the firmware that may be updated as discussed below.

The chassis 202 may also house a communication system 214 that is coupled to the operating system engine 204 (e.g., via a coupling between the communication system 214 and the processing system), and that may include a NIC, a wireless communication system (e.g., a BLUETOOTH® communication system, a WFi communication system, a Near Field Communication (NFC) system, etc.), and/or a variety of other communication components that would be apparent to one of skill in the art in possession of the present disclosure. The communication system 214 includes an in-band network connection 216 that is separate from the out-of-band network connection 210 included with the BMC 206. While a specific server device 200 providing the software update system of the present disclosure has been illustrated and described, one of skill in the art in possession of the present disclosure will recognize that software update systems according to the teachings of the present disclosure, as well as server devices in the examples provided below, may include a variety of components and/or component configurations for providing conventional functionality, as well as the functionality discussed below, while remaining within the scope of the present disclosure as well.

Figure 3:
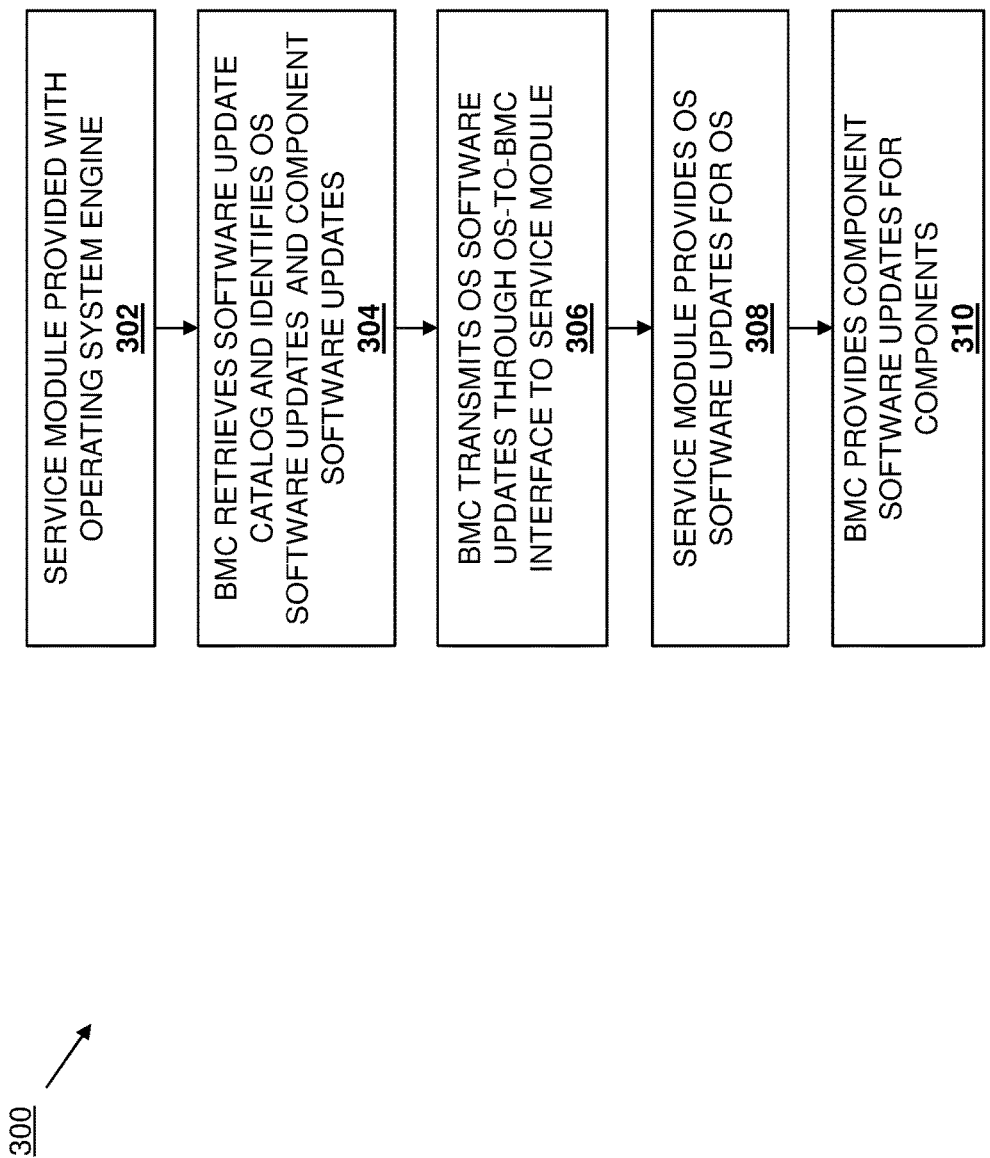
FIG. 3 is a flow chart illustrating an embodiment of a method for providing software updates.

Referring now to FIG. 3, an embodiment of a method 300 for providing software updates is illustrated. As discussed below, the systems and methods of the present disclosure provide for the updating of software in a server device without the inefficiencies associated with conventional systems. For example, during a server device maintenance or shutdown time period, a user can initiate an automatic software update process that results in the BMC retrieving a software update catalog and identifying the OS driver update package and/or application update package included therein. The BMC may then stage and initiate a software update via a service module included in the OS by using a secure file transfer protocol to transfer the OS driver update package and/or the application update package to the service module via an OS-to-BMC interface such as a USB NIC interface. The service module running in the OS will be listening for update notifications, which allows the service module to receive and apply the OS driver update package and/or the application update package applicable to the OS in the server device maintenance or shutdown time period. Once the OS driver update package and/or the application update package has been provided for the OS, the service module may notify the BMC, which will then operate to provide a component firmware update package included in the software update catalog for components included in the server device. As such, the systems and methods of the present disclosure eliminate the need for a management console to apply OS software updates, the need to retrieve multiple copies of the same software catalog, and the need for an administrator to coordinate the firmware update installation and the driver update/application update installation between the BMC and a management console, which produces increased efficiencies and decreased costs associated with the server device update process.

The method 300 begins at block 302 where a service module is provided with an operating system engine. As discussed above, in some embodiments, the service module 204a may come pre-installed in the operating system engine 204 of the server device (e.g., by the service device manufacturer/provider at the factory) and, as such, in those embodiments block 302 of the method 300 may be skipped. However, in other embodiments, at block 302 and during an initial boot of the server device 200 (e.g., the first boot of the server device after being provided to a customer), the BMC 206 may present a virtual USB drive that includes a service module installer to an OS installer (not illustrated) that is running on the server device 200. In some examples, the OS installer may be configured to look for service module installers only on the initial boot of the server device 200, while being configured to ignore service module installers on any subsequent boot. As such, during the initial boot scenario discussed above, the OS installer will find the service module installer included on the virtual USB drive being presented by the BMC 206 (e.g., via an Intelligent Platform Management Interface (IPMI)). In response, the OS installer may retrieve a checksum (e.g., a Message Digest 5 (MD5) algorithm value, a Secure Hash Algorithm (SHA) value, etc.) from the BMC 206, and use that checksum to verify the service module installer included in the virtual USB drive (e.g., by performing the MD5 algorithm or SHA on the service module installer, and determining whether the result matches the checksum (e.g., a MD5 algorithm value or SHA value) retrieved from the BMC 206). If the service module installer is verified, the OS installer may use that service module installer to install the service module 204a on the operating system engine 204. Following the installation of the service module 204a, the OS installer may inform the BMC 206 of that installation, and the BMC 206 may no longer expose the virtual USB drive to the OS installer.

One of skill in the art in possession of the present disclosure will recognize that the process of providing the service module, or any application, for the OS as discussed above provides improvements over conventional systems. For example, in conventional systems, OS application installation requires an agent running in the OS for the out-of-band installation of any applications, and BMC installations like those described above require a two-step process that includes staging the application installer from out-of-band, and using a virtual console to access the OS or providing physical access (e.g., via Secure Socket Shell (SSH) or Remote Desktop Protocol (RDP)) to the OS in order to run the application installer. As such, the provisioning of application installers via the BMC in the manner discussed above for the service module installer allows applications such as the service module 204a to be automatically installed in the OS via the BMC using native OS capabilities. Furthermore, such provisioning of application installers/applications utilizes a generic method that is not tied with a specific application, driver installation, or OS type. Finally, such provisioning of application installers/applications does not require going to the OS for application installation, as only access to the BMC is needed (which is typical in most pre-OS deployments.)

The method 300 then proceeds to block 304 where a BMC retrieves a software update catalog and identifies OS software updates and component software updates. In an embodiment, prior to the method 300, a server device provider may generate a software update catalog that includes a plurality of catalog files that include metadata identifying software updates for the server components 212 and an OS provided by the OS engine 204. For example, the software update catalog may include metadata identifying software updates for server device 200 that include firmware updates (e.g., firmware update packages) for any or all of the server components, driver updates (e.g., OS driver update packages) for the OS provided by the OS engine 204, application updates (e.g., OS application update packages) for the OS provided by the OS engine 204, and/or any other software updates and/or software update catalog files that would be apparent to one of skill in the art in possession of the present disclosure. In some embodiments, the service device provider may make the software update catalog available via a website controlled by the server device provider.

Thus, in an embodiment of block 304, the BMC 206 in the server device 200 may retrieve the software update catalog for the server device 200 from the server device provider via, for example, the out-of-band network connection 210. The retrieval of the software update catalog by the BMC 206 may be performed in response to the instructing of a software update process by a user of the server device 200, which may be initiated during a server device maintenance time period, server device shutdown time period, and/or any other time period that would be apparent to one of skill in the art in possession of the present disclosure. Upon retrieving the software update catalog for the server device 200, the BMC 206 operates to analyze that software update catalog to identify the firmware updates (e.g., firmware update packages) for any or all of the server components, the driver updates (e.g., OS driver update packages) for the OS provided by the OS engine 204, the application updates (e.g., OS application update packages) for the OS provided by the OS engine 204, and/or any other software updates and/or software update catalog files that would be apparent to one of skill in the art in possession of the present disclosure.

The method 300 then proceeds to block 306 where the BMC transmits the OS software updates through an OS-to-BMC interface to the service module. In an embodiment, at block 306, the BMC 206 operates to transfer the driver updates for the OS provided by the OS engine 204 (which were identified in the software update catalog at block 304) and/or the application updates for the OS provided by the OS engine 204 (which were identified in the software update catalog at block 304) via the OS-to-BMC interface 208 to the service module 204a included in the OS engine 204. In a specific example, the BMC 206 may transfer the OS driver updates and/or the OS application updates via a USB NIC interface that provides the OS-to-BMC interface 208, and to the service module 204a using any of a variety of secure file transfer protocols that would be apparent to one of skill in the art in possession of the present disclosure.

The method 300 then proceeds to block 308 where the service module provides the OS software updates for an OS. In an embodiment, at block 308, the service module 204a may be listening for update notifications and, as such, will receive the OS driver updates and/or the OS application updates from the BMC 206 via the OS-to-BMC interface 208 (e.g., a USB NIC interface.) In response to receiving the OS driver updates and/or the OS application updates, the service module 204a may operate to provide those OS driver updates and/or OS application updates for the OS by, for example, installing those OS driver updates and/or OS application updates in the operating system engine 204. In an embodiment, the service module 204a may send an OS software update confirmation via the OS-to-BMC interface 208 to the BMC 206 in response to completing the provisioning of OS software update(s) for the OS. For example, the service module 204a may operate to install any OS driver updates received at block 306 in the operating system engine 204 and, upon completion, send an OS driver update confirmation via the OS-to-BMC interface 208 to the BMC 206. In another example, the service module 204a may operate to install any OS application updates received at block 306 in the operating system engine 204 and, upon completion, send an OS application update confirmation via the OS-to-BMC interface 208 to the BMC 206. Furthermore, in some examples, in addition to the OS driver update confirmation(s) and/or OS application update confirmation(s), or in place of those OS driver update confirmation(s) and/or OS application update confirmation(s), the service module 204a may send a OS software update confirmation via the OS-to-BMC interface 208 to the BMC 206 in response to completing the provisioning of all available OS software update(s) for the OS.

The method 300 then proceeds to block 310 where the BMC provides the component software updates for components. In an embodiment, at block 310, the BMC 206 operates to provide the firmware updates (e.g., firmware update packages), which were identified for any or all of the server components 212 at block 304, for those server components 212. For example, following receiving the OS software update confirmation(s) from the service module 204a at block 308 (which may include OS driver update confirmation(s) and/or OS application update confirmation(s)), the BMC 206 may operates to install any component firmware updates that were identified in the software update catalog at block 304 on the server components 212 those component firmware updates were identified for. One of skill in the art in possession of the present disclosure will recognize that, in some embodiments, firmware updates may require a restart or reboot of the server device 200 and, as such, having the BMC 206 wait to begin the installation of the firmware updates for the server components 212 at block 310 until the OS software updates are completed may prevent the interruption of those OS software updates. However, in other embodiments, the installation of the component firmware updates by the BMC 206 may occur before and/or at the same time as the OS driver and/or OS application updates while remaining within the scope of the present disclosure as well.

Thus, systems and methods have been described that provide a more efficient software update process for a server device relative to conventional systems that require two update subsystem (e.g., a BMC and a management console) that retrieve copies of the same software update catalog and require an administrator to coordinate their installation of software updates included in those software catalogs. Such efficiencies are realized via a BMC that retrieves a single copy of a software update catalog for a server device, and identifies firmware updates included in the software update catalog for the server components in the server device, and OS driver updates/OS application updates in the software update catalog for the OS. The BMC then provides the OS driver updates/OS application updates via an OS-to-BMC interface to a service module included in the OS, and the service module provides those OS driver updates/OS application updates for the OS. The BMC may then provide the firmware updates for the server components. As such, conventional management consoles are not required to provide OS software updates on a server device, and the BMC may enable the provisioning of those OS software updates for the OS by retrieving a single copy of the software update catalog, while an administrator is not required to coordinate to firmware/OS driver/OS application updating processes.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A software update system, comprising:
   a chassis;
   a plurality of components that are included in the chassis;
   an Operating System (OS) engine that is included in the chassis and that is configured to provide an OS; and
   a Baseboard Management Controller (BMC) that is included in the chassis, coupled to each of the plurality of components, and coupled to the OS engine via an OS-to-BMC interface, wherein the BMC is configured to:
      retrieve a software update catalog that includes a plurality of software updates;
      identify OS software updates that are included in the plurality of software updates in the software update catalog, and component software updates that are included in the plurality of software updates in the software update catalog; and provide the OS software updates to the OS engine via the OS-to-BMC interface, wherein the OS engine is configured to:
install the OS software updates for the OS; and
transmit an OS software update installation confirmation to the BMC in response to completion of the installation of the OS software updates for the OS, and wherein the BMC is further configured to:
wait to begin installation of the component software updates for the plurality of components until the OS software updates are completed; and
install, in response to receiving the OS software update installation confirmation, the component software updates for the plurality of components.

2. The system of claim 1, wherein the OS software updates include at least one of a driver update and an application update, and wherein the component software updates include a firmware update.

3. The system of claim 1, wherein the OS-to-BMC interface is provided by a Universal Serial Bus (USB) Network Interface Controller (NIC) interface.

4. The system of claim 1, wherein the OS engine is configured to provide a service module, and wherein the service module is configured to receive the OS software updates and provide the OS software updates for the OS.

5. The system of claim 4, wherein OS engine is configured, during an initial boot operation, to:
receive a service module installer from the BMC;
verify the service module installer; and
install the service module using the service module installer.

6. An Information Handling System (IHS), comprising:
a Baseboard Management Controller (BMC) that is coupled to an Operating System (OS)-to-BMC interface, wherein the BMC is configured to:
identify OS software updates that are included in a plurality of software updates provided in a software update catalog, and component software updates that are included in the plurality of software updates provided in the software update catalog;
transmit the OS software updates through the OS-to-BMC interface;
provide the component software updates for a plurality of components;
a processing system that is coupled to the OS-to-BMC interface; and
a memory system that is coupled to the processing system and that includes instructions that, when executed by the processing system, cause the processing system to:
receive the OS software updates via the OS-to-BMC interface;
install the OS software updates for an OS; and
transmit an OS software update installation confirmation to the BMC in response to completion of the installation of the OS software updates for the OS, wherein the BMC is configured to:
wait to begin installation of the component software updates for the plurality of components until the OS software updates are completed; and
begin installing the component software updates for the plurality of components in response to receiving the OS software update installation confirmation.

7. The IHS of claim 6, wherein the OS software updates include at least one of a driver update and an application update, and wherein the component software updates include a firmware update.

8. The IHS of claim 6, wherein the OS-to-BMC interface is provided by a Universal Serial Bus (USB) Network Interface Controller (NIC) interface.

9. The IHS of claim 6, wherein the memory system includes instructions that, when executed by the processing system, cause the processing system to provide a service module, and wherein the service module is configured to receive the OS software updates and provide the OS software updates for the OS.

10. The IHS of claim 9, the memory system includes instructions that, when executed by the processing system, cause the processing system, during an initial boot operation, to:
receive a service module installer from the BMC;
verify the service module installer; and
install the service module using the service module installer.

11. A method for providing software updates, comprising:
identifying, by a Baseboard Management Controller (BMC), Operating System (OS) software updates that are included in a plurality of software updates provided in a software update catalog, and component software updates that are included in the plurality of software updates provided in the software update catalog;
transmitting, by the BMC, the OS software updates through an OS-to-BMC interface;
receiving, by an OS engine, the OS software updates via the OS-to-BMC interface;
installing, by the OS engine, the OS software updates for an OS;
transmitting, by the OS engine in response to receiving the OS software update installation confirmation, an OS software update installation confirmation to the BMC in response to the completion of the installation of the OS software updates for the OS;
waiting, by the BMC, to begin installation of the component software updates for the plurality of components until the OS software updates are completed; and
begin installing, by the BMC in response to receiving the OS software update installation confirmation, the component software updates for a plurality of components.

12. The method of claim 11, wherein the OS software updates include at least one of a driver update and an application update, and wherein the component software updates include a firmware update.

13. The method of claim 11, wherein the OS-to-BMC interface is provided by a Universal Serial Bus (USB) Network Interface Controller (NIC) interface.

14. The method of claim 11, further comprising:
providing, by the OS engine, a service module, wherein the service module is configured to receive the OS software updates and provide the OS software updates for the OS.

15. The method of claim 11, further comprising:
receiving, by the OS engine during an initial boot operation, a service module installer from the BMC;
verifying, by the OS engine during the initial boot operation, the service module installer; and
installing, by the OS engine during the initial boot operation, the service module installer using the service module installer.

* * * * *